(12) United States Patent
Maccanti et al.

(10) Patent No.: US 11,805,027 B2
(45) Date of Patent: Oct. 31, 2023

(54) MACHINE LEARNING USING SERVERLESS COMPUTE ARCHITECTURE

(71) Applicant: Amazon Technologies, Inc., Seattle, WA (US)

(72) Inventors: Maximiliano Maccanti, Redmond, WA (US); Gowda Dayananda Anjaneyapura Range, Redmond, WA (US); Rishabh Ray Chaudhury, Bellevue, WA (US); Michael Pham, Seattle, WA (US); Shruti Sharma, Seattle, WA (US); Saumitra Vikram, Chennai, TN (US); James Alan Sanders, New York, NY (US); Mihir Sathe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,853

(22) Filed: Mar. 31, 2022

(65) Prior Publication Data

US 2023/0171164 A1 Jun. 1, 2023

(30) Foreign Application Priority Data

Nov. 27, 2021 (IN) .............................. 202111054927

(51) Int. Cl.
*H04L 41/16* (2022.01)
*H04L 67/01* (2022.01)
*H04L 67/02* (2022.01)

(52) U.S. Cl.
CPC .............. *H04L 41/16* (2013.01); *H04L 67/01* (2022.05); *H04L 67/02* (2013.01)

(58) Field of Classification Search
None
See application file for complete search history.

(56) References Cited

U.S. PATENT DOCUMENTS

| 11,671,604 | B1 * | 6/2023 | Khsib | H04N 19/184 |
| | | | | 375/240.03 |
| 2022/0301076 | A1 * | 9/2022 | Coutinho | G06Q 10/067 |
| 2022/0413993 | A1 * | 12/2022 | Farinas | H04L 41/145 |

(Continued)

OTHER PUBLICATIONS

Anonymous, "Amazon SageMaker Developer Guide—first 400 pages," Apr. 22, 2021, Retrieved from the Internet URL:https://dokumen.pub/gdownload/amazon-sagemaker-developer-guide.html [retrieved on Feb. 16, 2023],405 pages.

(Continued)

*Primary Examiner* — Quang N Nguyen
(74) *Attorney, Agent, or Firm* — Davis Wright Tremaine LLP

(57) ABSTRACT

A serverless computing system is configured to provide access to a machine learning model by at least associating an endpoint, comprising code that accesses the machine learning model, with an extension that interfaces between a serverless compute architecture and the endpoint. A request to perform an inference is received by the system and processed by using the serverless compute architecture to execute a compute function. The compute function cases the extension to interface with the endpoint to cause the machine learning model to perform the inference.

18 Claims, 9 Drawing Sheets

(56) References Cited

U.S. PATENT DOCUMENTS

| | | | | |
|---|---|---|---|---|
| 2023/0137436 A1* | 5/2023 | Chen | ............ | G06N 20/00 726/26 |
| 2023/0169396 A1* | 6/2023 | Maccanti | ............ | G06N 20/00 706/10 |

OTHER PUBLICATIONS

Anonymous, "AWS Lambda Developer Guide—first 400 pages," Jul. 1, 2021, Retrieved from the Internet:URL:https://web.archive.org/web/202107011001281f_/https://docs.aws.amazon.com/laMbda/latest/dg/lambda-dg.pdf [retrieved on Feb. 17, 2023], 405 pages.

Anonymous, "AWS Learning Path: AWS Lambda Extensions: The Deep Dive," Aug. 17, 2021, Retrieved from the Internet: URL:https://web.archive.org/web/20210817002110/https://aws.amazon.com/lambda/aws-learning-path-lambda-extensions/ [retrieved on Feb. 17, 2023], 7 pages.

Anonymous, "Introducing AWS Lambda Extensions 1 AWS Compute Blog," Oct. 8, 2020, Retrieved from the Internet:URL:https://aws.amazon.com/blogs/compute/i ntroducing-aws-lambda-extensions-in-preview/ [retrieved on Feb. 17, 2023], 10 pages.

International Search Report and Written Opinion dated Mar. 1, 2023, Patent Application No. PCT/US2022/080189, 15 pages.

Subramanian, et al., "Build reusable, serverless inference functions for your Amazon SageMaker models using AWS Lambda layers and containers:AWS Machine Learning Blog," Jun. 1, 2021, Retrieved from the Internet:URL:https://aws.amazon.com/blogs/machine-learning/build-reusable-serverless-inference-functions-foryour-amazon-sagemaker-models-using-aws-lambda-layers-and-containers/ [retrieved on Feb. 17, 2023], 18 pages.

Wood, "Working with Lambda Layers and Extensions in Container Images," Dec. 3, 2020, Retrieved from the Internet:uRL:https://aws.amazon.com/blogs/compute/working-with-lambda-layers-and-extensions-in-container-images/ [retrieved on Feb. 17, 2023], 9 pages.

* cited by examiner

MACHINE LEARNING USING SERVERLESS COMPUTE ARCHITECTURE

CROSS-REFERENCE TO RELATED APPLICATIONS

This application incorporates by reference for all purposes the full disclosure of co-pending U.S. patent application Ser. No. 17/710,864, filed Mar. 31, 2022, entitled "MACHINE LEARNING USING A HYBRID SERVERLESS COMPUTE ARCHITECTURE."

BACKGROUND

Machine learning techniques are increasingly being used in a wide variety of industries. However, these techniques can be difficult to maintain and manage. The development and use of a machine learning model can require significant amounts of computing resources, such as memory and processing time. These resources may be difficult to obtain and manage, and this can present a significant obstacle to the adoption machine learning techniques.

BRIEF DESCRIPTION OF THE DRAWINGS

Various techniques will be described with reference to the drawings, in which.

DETAILED DESCRIPTION

Figure 1:
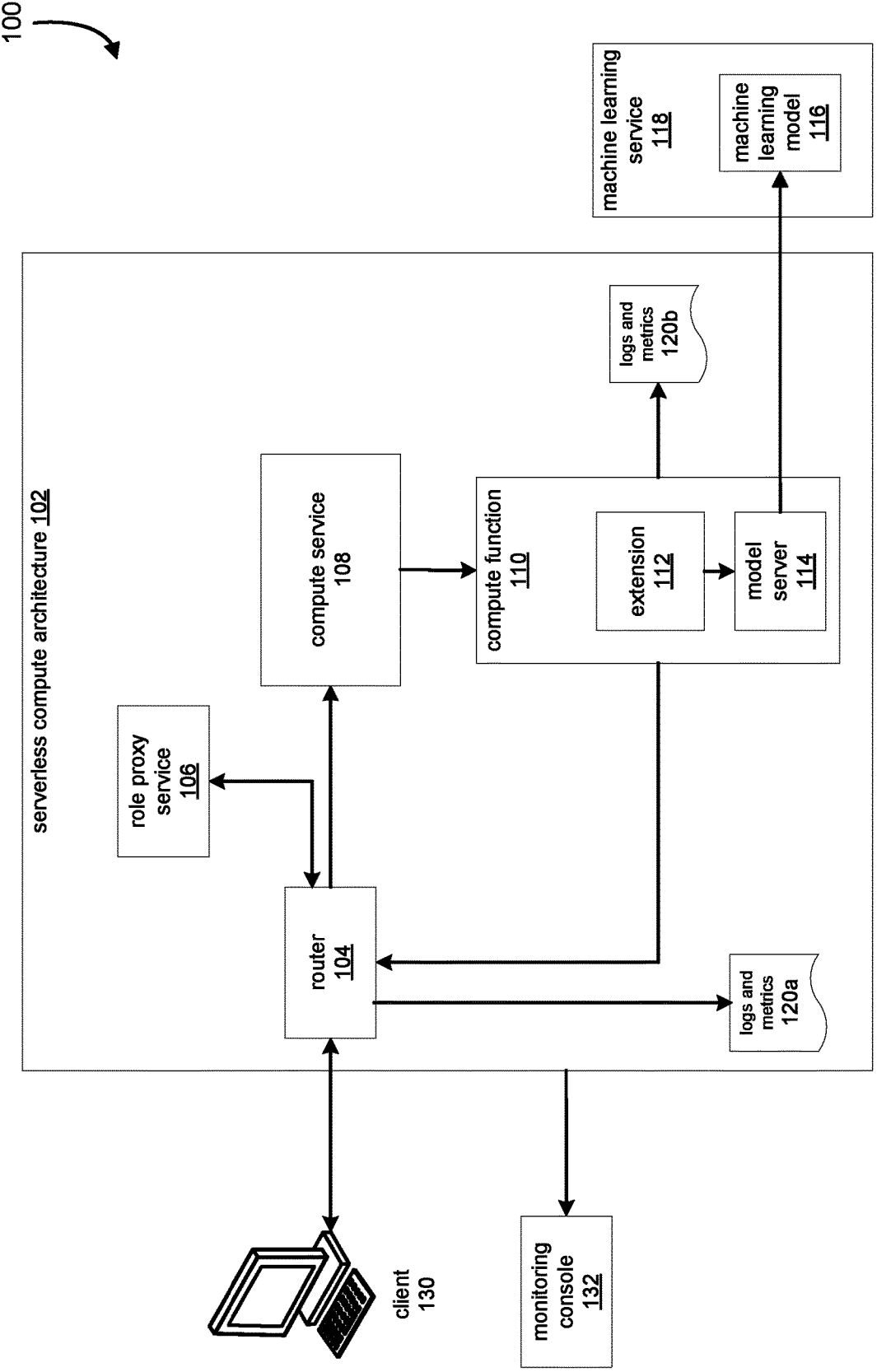
FIG. 1 illustrates a system for performing machine learning inference, comprising a serverless compute architecture, in accordance with at least one embodiment.

In an example, a system leverages a serverless compute architecture to generate inferences using a machine learning model. A serverless compute architecture, which may also be referred to as a serverless computing system or serverless computing subsystem, includes hardware and software that dynamically provision computing resources to execute a compute function. Access to the machine learning model is facilitated using a model server which, while usable on a dedicated server, can also be used leveraging a serverless compute architecture by employing techniques described herein.

In a server-based application, a user of a machine learning service may create and train a machine learning model that is hosted by the service. To use the hosted machine learning model, or other computational service, the customer is assigned a dedicated server instance on which a model server is installed and activated. The model server is a unit of code that implements a hypertext transfer protocol ("HTTP") server that listens for requests to obtain inferences from the model, and responds to those requests by interacting with the hosted model. The dedicated service is a computing device assign the task of hosting the model server. Using a dedicated server may not work well if there is a surge in demand because the capacity of the dedicated server instance may be limited. Furthermore, this approach would typically require other overhead, such as administrative burden.

To address these issues, the user is able to request that access to a machine learning model be provided using a serverless configuration. In an embodiment of the example, this is done by specifying, in an endpoint configuration, that a serverless configuration should be used. Additional parameters may also be supplied, such as a maximum amount of memory to utilize or a maximum number of concurrent requests to support. These parameters can be used to help manage capacity utilized by the serverless environment. Here, the endpoint refers to an address or other means of identifying or accessing the machine learning model. The endpoint may server as an outward-facing interface that to which users of a machine learning model, or other computation service, direct their requests.

When a serverless configuration is requested, the system configures a serverless compute architecture to use the model server to process requests to obtain inferences, and a router is configured to forward such requests to the serverless compute architecture. To enable use of the model server, the system generates a container that comprises the model server and an extension that interfaces between the serverless compute architecture and the extension. Generating the container can also include a sanitization process, which refers to the system editing or removing configuration data used by the model server. This can include configuration data that might, unless edited or removed, cause adverse effects. For example, the model server might have configuration data that is appropriate for when the model server is installed on a dedicated server instance, but not appropriate for when the model server is executed by a serverless compute architecture. The removed or edited information can be stored and recalled for later use, if and when the endpoint is configured to use a hybrid or serverfull configuration.

When a request to perform an inference is received, this container is retrieved from storage. The serverless compute architecture dynamically allocates computing capacity for invoking and execute a compute function that interfaces with the extension. The extension then activates the HTTP server implemented by the model server and invokes web-based methods implemented by the model server. This, in turn, causes the model server to access the machine learning model and obtain the requested inference.

In a further aspect of the example, a user may request that access to a machine learning model be provided using a hybrid mode of operation. When configured to operation in a hybrid mode, the system processes a portion of incoming inference requests using a dedicated server, on which the model server has been installed. The size of this portion may be determined such that it maximizes use of the dedicated server. However, to handle temporary surges in demand, or to handle increases in demand that have not yet been addressed by the addition of additions dedicated servers, the system employs the serverless compute architecture. Accordingly, requests exceeding the capacity of the dedicated server are handled using the serverless compute architecture, including the container comprising the model server and extension, as described in the preceding paragraphs.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a system for performing machine learning comprising a serverless compute architecture, in accordance with at least one embodiment. In the example system 100, a client 130 transmits requests to utilize a machine learning model 116, and this request is received by a router 104. The request is processed by the serverless compute architecture 102, which utilizes the machine learning model 116 in the requested manner, and returns a result to the client 130.

A machine learning model, such as the depicted machine learning model 116, can include, but is not limited to, data and code implementing any of various algorithms or techniques related to supervised and unsupervised learning, reinforcement learning, linear regressions, naïve Bayes networks, neural networks, deep learning, random forests, classification, regression, forecasting, and so on. A machine learning model, in at least one embodiment, comprises parameters for such a model or algorithm. These parameters could include, for example, the various connection weights associated with a neural network. In at least one embodiment, a machine learning model comprises a definition of the model's architecture and a set of parameters that represent the current state of the model. Typically, such parameters represent the current state of the model's training.

The serverless compute architecture 102 allows a compute function, such as the depicted compute function 110, to be executed using computing capacity that is assigned on an as-needed basis. The architecture 102 is described as serverless because, rather than dedicating a particular computing instance to executing the compute function, computing capacity is assigned dynamically in order to execute a compute function. Accordingly, a serverless compute architecture, such as the architecture 102 depicted in FIG. 1, comprises one or more computing systems that, in response to a request to invoke and execute a compute function, allocate computing capacity sufficient for invoking and executing the compute function, and then invoke and execute that function. A serverless compute architecture also, in some embodiments, tracks utilization of computing capacity based on an amount of capacity utilized by a client, rather than based on the number of server instances dedicated to a client's use. The capacity utilized by a client in a serverless compute architecture may be measured according to various metrics, potentially include the number of invocations of a compute function, the time taken to execute a compute function, or the size of input or output operations performed by a compute function. In the example system 100, the serverless compute architecture includes additional features that leverage serverless computing, using the techniques described herein, to utilize a machine learning model.

A compute function, such as the depicted compute function 110, comprise a unit of executable code. The code may comprise compiled instructions, source code, or intermediate code. A compute function may sometimes be referred to as a procedure, routine, method, expression, closure, lambda function, and so forth. In a serverless compute architecture, a compute function may be provided by a client. In the example system 100, the compute function 110 may, however, be automatically generated by the system 100 for use in leveraging the serverless compute architecture 102 to perform machine learning functions.

A request to utilize a machine learning model can include, but is not necessarily limited to, an electronic transmission or other communication that includes information indicating that a machine learning model, such as the depicted machine learning model 116, should perform an operation. These operations can include, but are not necessarily limited to, inferencing operations. As used herein, inferencing operations can include any of a wide variety of machine-learning tasks, such as classification, prediction, regression, clustering, segmentation, and so forth.

The router 104 can include a network device, or other computing device with network communications hardware, that is configured so as to be able to communicate with client 130 and various components of the serverless computing architecture 102. In at least one embodiment, the serverless computing architecture 102 comprises the router 104, while in other embodiments the router 104 is a front-end component that is separate from, but connects to and is capable of communicating with, the serverless computing architecture. Although not depicted in FIG. 1, the router 104 may also be connected to and communicate with server instances that are hosted on behalf of the client 130, and which host various model servers for utilizing a machine learning model. Examples of embodiments that include this configuration, sometimes referred to as a hybrid configuration, are described further in relation to FIG. 4.

The router 104, upon receiving a request to perform an inference, may determine that the request can be processed using serverless computing architecture 102. If so, the router 104 can determine to utilize the compute service 108 to obtain the inference, rather than directing the request directly to an model server hosted on a server. If a serverless architecture is to be used, the router 104 may therefore translate the request to a suitable data format and use the compute service 108 to invoke a suitable compute function 110.

In at least one embodiment, the router 104 leverages a role proxy service 106 so that appropriate levels of permissions or authorization are used when processing a request. In at least one embodiment, the role proxy service 106 comprises hardware and/or software to temporarily impersonate certain computing roles. This could include temporarily adopting a role whose permissions are suitable for utilizing the compute service 108, when these permissions are not associated with the incoming request. The request directed to router 104 may not necessarily have appropriate permissions, because requiring the incoming request to have such permissions might make it more difficult to setup or utilize the machine learning model 116 using serverless computing.

In at least one embodiment, the serverless computing architecture comprises a compute service 108, which dynamically allocates computing capacity for invoking and executing compute function 110. The compute service 108, which may also be described as a serverless compute service, comprises hardware to respond to a request to invoke and execute a compute function 110. This response comprises allocating sufficient computing capacity and then invoking and executing the compute function 110.

The compute function 110 is designed so that, when invoked by the compute service 108 and executed, it interfaces with extension 112 to cause model server 114 to obtain inferences from, or otherwise utilize, the machine learning model 116.

In at least one embodiment, the machine learning model 116 is hosted by a machine learning service 118. The service may comprise computing devices and other computing resources configured to provide capabilities related to the configuration, training, deployment, and use of machine learning models. In some cases and embodiments, the service 118 may include storage for model parameters, while in other cases and embodiments, an external storage service may be used in addition to the machine learning service 118.

A model server 114 comprises code to interface with the machine learning model 116. Here, interfacing can refer to interactions between modules, libraries, programs, functions, or other unit of code. Examples include, but are not necessarily limited to, a module invoking a function of another module and obtaining a result, a module initiating a procedure on another module, a program accessing a property implemented by a class of a library, and so on. It will be appreciated that these examples are intended to be illustrative rather than limiting. In general, the model server 114 serves as a front-end to the machine-learning model 116, and can be used, for example, to train the model 116 or obtain inferences using the model 116.

Figure 4:
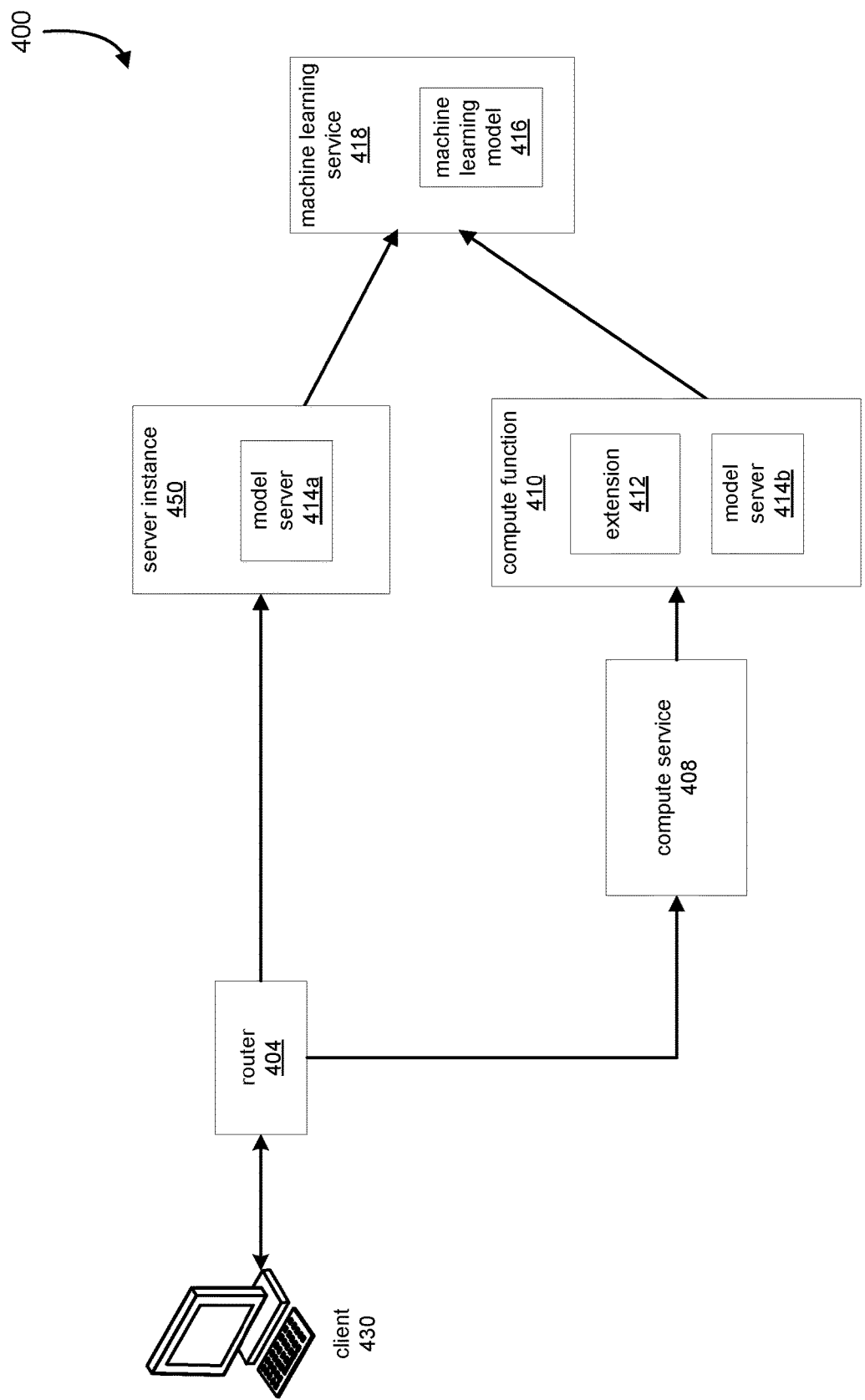
FIG. 4 illustrates an example of a hybrid system incorporating serverless and server-full processing of a machine learning inference, in accordance with at least one embodiment.

In at least one embodiment, the model server 114 is compatible not only with the serverless computing architecture 102 depicted in FIG. 1, but also with server-based configurations in which a client accesses the model server 114 directly. FIG. 1 depicts the usage of the model server 114 within the context of serverless computing, while an example of using the model server 114 in a hybrid context, involving both serverless and server-based configurations, is depicted in FIG. 4.

In at least one embodiment, the model server 114 comprises code to implement a hypertext transfer protocol ("HTTP") server. The server, in such embodiments, is implemented to receive HTTP-compatible messages that request that a machine learning task be performed using a machine learning model. For example, in at least one embodiment, the model server includes code that receives an HTTP-compatible request to perform an inference, and responds with an HTTP-compatible response that comprises data obtained by performing the inference. The request may include various parameters or attributes relevant to the request, such as the name of the endpoint, an identifier of the machine learning model to be used, an identifier of the inference to be made, input to the machine learning model, and/or other data.

When operating within a serverless computing architecture, such as the serverless computing architecture 102 depicted in FIG. 1, the model server 114 is not hosted on a dedicated instance of server, since the serverless compute architecture 102 dynamically allocates computing resources on a per-request basis. This may create various challenges. One such challenge is due to dissimilar data formats used to invoke serverless compute functions in a serverless compute environment, as compared to the data format used in an HTTP-compatible request. Another is that HTTP servers are typically long-running. While an HTTP server may be activated once on a dedicated server and left running, this approach may not be viable in a serverless computing environment, because resources assigned to invoke and execute a compute function are assigned dynamically, and in some cases may not persist for longer than the duration of a single request.

An extension 112 is used, in embodiments, to address these issues. The extension 112, comprises code to interface with the model server 114. The interfacing can include operations to translate between data formats. For example, in at least one embodiment, the compute service 108 may accept invocations of a compute function 110 in a limited number of data formats. In one example, JavaScript Object Notation ("JSON") format is used, although it will be appreciated that this example is intended to be illustrative rather than limiting. Note, however, that it may be advantageous for the system 100 to leverage a pre-existing compute service 108, without modifications specifically directed to enabling machine learning. Accordingly, it may not be practical to change the data format used to invoke the compute function 110, and to address this problem, the extension 112 translates between the data format used to invoke the compute function 110 and whatever data format is expected by the model server 114.

In at least one embodiment, the extension 112 also includes code to activate the model server 114 for use within the context of the compute function 110. This can include, for example, interfacing with the model server 114 to initialize an HTTP server implemented by the model server 114, so that the extension 112 may then further utilize the HTTP server to access the machine learning model 116.

In at least one embodiment, the system 100 includes various facilities for logging activity and recording metrics. These can include metrics related to the operation of the router 104 and the serverless computing architecture 102. For example, the router 104 and compute function 120$a,b$ may each output logs and metrics related to their respective activities. These and other logs and metrics may be made available to the client 130, via a monitoring console 132.

Figure 2:
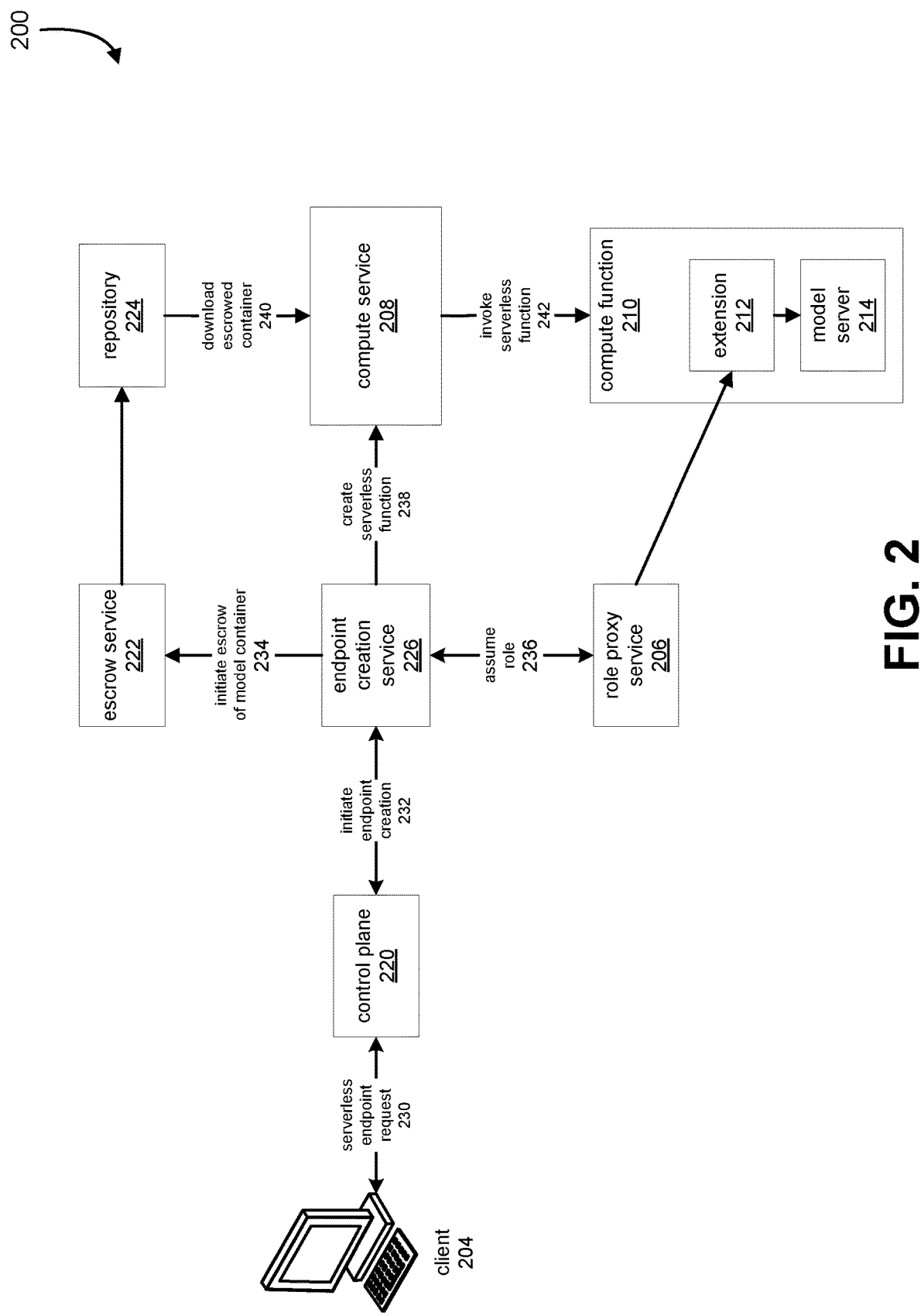
FIG. 2 illustrates an example process for enabling a serverless compute architecture to perform machine learning inference, in accordance with at least one embodiment.

FIG. 2 illustrates an example process for enabling a serverless compute architecture to perform machine learning, in accordance with at least one embodiment. In the example 200, a client 204 requests that access to machine learning capabilities, such as inference, be provided to the client 204 via a serverless compute architecture.

In at least one embodiment, a serverless endpoint request 230 is provided by the client 204 to a control plane 220. The serverless endpoint request 230 comprises data indicating that the client wishes to access machine learning capabilities, and that such access should be provided using a serverless compute architecture. The serverless endpoint request 230 may also contain additional configuration information that may be used to limit computing capacity to be utilized by the serverless compute architecture on behalf of the client. The imposition of such limits may help manage costs and improve provisioning of computing capacity.

The control plane 220 can comprise hardware and/or software to coordinate execution of a workflow, such as the one described in relation to FIG. 2, to enable creation of an endpoint for utilizing a machine learning model via a serverless architecture. In response to receiving the serverless endpoint request 230, the control plane 220 may send commands to initiate endpoint creation 232 to an endpoint creation service 226.

An endpoint creation service 226 can comprise hardware and/or software that generates a model container comprising a model server and an extension, initiates escrow of the model container 234, and where appropriate utilizes a role proxy service 206 to assume roles 236 used to generate the model container. In at least one embodiment, the task of creating the container is delegated to the escrow service 222. The endpoint creation service 226 can create a serverless compute function at 238, for later use by the compute service 208.

In at least one embodiment, the model container is a binary file comprising a model server 214 and an extension 212. The model server 214 and extension 212 may correspond to the model server 114 and extension 112 depicted in FIG. 1. The model server 214 comprises code for interfacing with a machine learning model, and may be compatible with usage in serverless, server-full, and hybrid configurations. The extension 212 comprises code to interface between a serverless compute function 210 and the model server 214.

As used herein, a serverless configuration is one which permits compute functions, such as those performed by model server 214 and extension 212, to be performed without requiring a dedicated server. A server-full configuration, in contrast, uses dedicated servers instead of a serverless compute architecture. A hybrid configuration uses at least some dedicated instances, but also employs a serverless compute architecture.

An escrow service 222 comprises hardware and/or software to generate, validate, and/or store a model container. The escrow service 222 may store a model container in a repository 224, where it can be subsequently downloaded by a compute service 208. At this point, the system 200 is configured for the serverless provision of machine learning capabilities.

The repository 224, in at least one embodiment, comprises a storage system in which containers are stored. The repository 224 may storage many such containers, and each container may map be associated with a different machine learning model or endpoint. As an illustrative example, the repository 224 might contain three containers, the first including model server $M_1$ corresponding to endpoint $E_1$, the second including model server $M_2$ corresponding to endpoint $E_2$, and the third including model server $M_3$ corresponding endpoint $E_3$. Each of the endpoints $E_1$, $E_2$, and $E_3$ or the associated model servers may, in turn, be associated with a different IP address and machine learning model. They may also be associated with different clients.

In at least one embodiment, the system 200 can then respond to a request to perform a machine learning task by downloading the escrowed container 240 to the compute service 208 at step 240, and then invoking the compute function 210 at step 242. In at least one embodiment, the compute function 210 is implemented by code that is automatically generated by the system 200 during the escrow process and included in the container. The compute function 210, after being invoked by the computer service 208, interfaces with the extension, which then translates the request to perform a machine learning task to a format usable by model server 214, and interfaces with the model server 214 to cause it to obtain results of the inference from a machine learning model. This process is explained in more detail in relation to FIG. 1.

Figure 3:
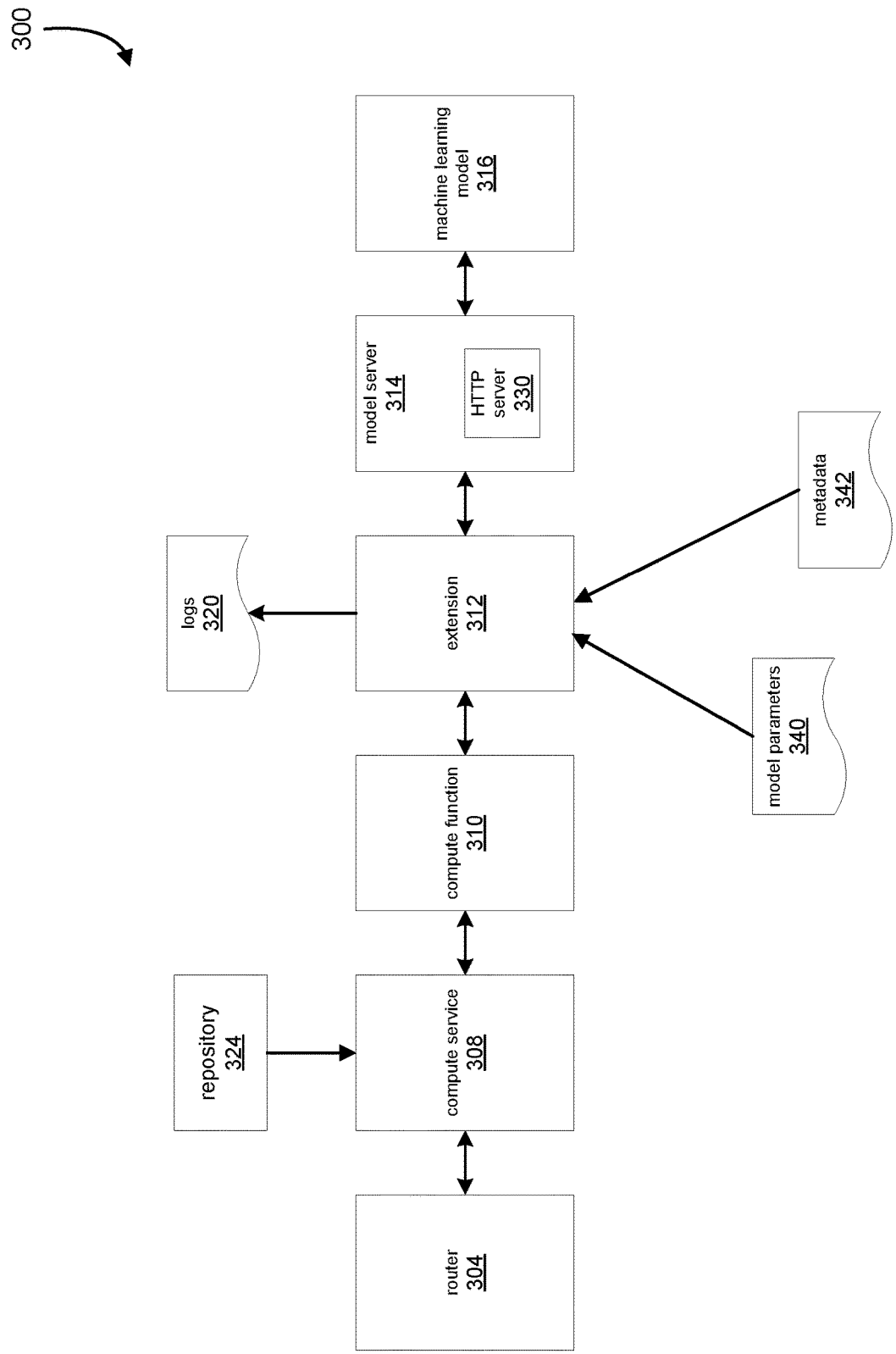
FIG. 3 illustrates an example of invocation and execution of a compute function to perform machine learning inference, in accordance with at least one embodiment.

FIG. 3 illustrates an example of invocation and execution of a compute function to perform machine learning inference, in accordance with at least one embodiment. In the example system 300, a router 304 receives a request to perform an inference. The router 304 may be similar to the router 104 depicted in FIG. 1. The router 304 determines that the request is associated with an model server 314, and that the model server has been configured to operate in serverless configuration. This determination can be made in a variety of ways, potentially including but not limited to retrieving and examining configuration metadata associated with the model server to which the request was directed.

The system 300, having determined that the request is to be performed using a serverless configuration, causes a compute service 308 to obtain extension 312 and model server 314 from the repository 324. This may be done in response to a message from the router 304, which may forward the request to the compute service 308 once it has determined that a serverless configuration should be employed to process the request to perform an inference.

In at least one embodiment, the extension 312 and model server 314 are stored within a container file, and the container file is retrieved from the repository 324. The container may be found in the repository 324 based on an index associating the model server to which the request was directed, in this example the model server 314, and the container. The container may also contain an implementation of the compute function 310, and in some embodiments, the compute function 310 is implemented by the extension 312. In other embodiments, the system 300 may obtain an implementation of the compute function separately from the container or the extension 312. The model server 314 and the extension 312 may also, in some embodiments, be stored and retrieved separately, and not combined into a single container file.

The compute service 308 invokes the compute function 310, which comprises code to use the extension 312 so that it ensures that the model server 314 is activated and interfaces with the model server 314 to obtain an inference. For example, in embodiments where the model server 314 implements an HTTP server, the extension 312 is caused by the compute function to ensure that the HTTP server has been initialized. The extension is also caused to issue, to the HTTP server, one or more HTTP requests to perform inferences using the machine learning model 316. The extension 312 may include code to convert data provided via the compute function to a format compatible with the HTTP request. This may convey an advantage in that it allows the use of pre-existing serverless compute architectures and pre-existing machine learning platforms and services, without extensive modification.

The extension 312 may also retrieve data needed by the model server 314. This can include, for example, model parameters 340 and various forms of metadata 342. The extension 312 can provide this data as needed to the model server 314. In order to utilize the model server 314 in a serverless configuration, it may be necessary to provide the endpoint with data that might normally be available, in a server-full implemented, on whatever server instance the endpoint were installed on. However, since a serverless architecture is being employed, this data cannot be pre-installed on a dedicated service instance. This technical challenge may be addressed by using the extension 312 to load model parameters 340, metadata 342, or other required information from their respective storage locations and provide the information to the model server 314 on an as-needed basis. This can be done by the extension 312 interfacing with the model server 314 to provide it with parameters 340, metadata 342, or other information to be used by the machine learning model 316. In some cases, such as where the machine learning model is hosted on a machine learning service, such as the one depicted in FIG. 1, the extension 312 may trigger whatever interactions with that service are necessary to cause the model to be prepared for use. The extension 312, in at least one embodiment, stores log data in logs 320.

Examples of interfacing operations that can occur between the extension 312 and the model server 314 can potentially include, but are not limited to, configuration operations, inferencing operations, training operations, debugging operations, data transformation operations, and so forth. A request to perform one of these operations may be received by the extension 312, which may in turn convert the request to a format compatible with the model server 314, and interface with the model server 314 to cause it to perform the requested operation, and obtain any results of the operation.

The model server 314 performs these operations by interacting with the machine learning model 316. The model server 314 may comprise an HTTP server 330. The machine learning model may be hosted on a distributed, scalable service for configuring, training, deploying, and use of machine learning models. In such embodiments, the model server 314 may interface with the service by invoking web-based methods provided by the service for hosting a machine learning model. The web-based methods implemented by the service can potentially include, but are not limited to, configuration operations, inferencing operations, training operations, debugging operations, data transformation operations, and so forth.

FIG. 4 illustrates an example of a hybrid system incorporating serverless and server-full processing of a machine learning inference, in accordance with at least one embodiment. A hybrid system, such as the depicted system 400, provides machine learning capabilities utilizing one or more dedicated server instances on which machine learning operations are performed, while also incorporating a serverless compute architecture that provides additional capacity for performing machine learning operations. In at least one embodiment, a baseline amount of machine learning operations are performed by the dedicated instances, and a serverless computing architecture is employed to provide surge capacity.

In at least one embodiment, the hybrid system 400 comprises a router 404. Similarly to the router 104 depicted in FIG. 1, the router 404 can include a network device, or other computing device with network communications hardware, that is configured so as to be able to communicate with client 430 and various components of the hybrid system 400, including dedicated server instances, such as the depicted server instance 450, and the compute service 408.

The router 404 receives a volume of requests from the client 430, and distributes the requests between the model server 414a on the server instance 450 and the compute service 408. If there is more than one server instance 450, some proportion of the requests can be divided among the server instances and the model servers installed on them, either by the router or a load balancing component. In at least one embodiment, the proportion of requests routed to the server instance 450 is based on utilization of the instance's capacity. When utilization exceeds a threshold amount, the router 404 begins distributing some proportion of the requests to the compute service 408. The proportion sent to the compute service 408 may be dynamically adjusted to maximize utilization of dedicated compute instances, while also preventing the instances from being overloaded. Embodiments may also attempt to minimize utilization of the compute service 408 in order to minimize costs. For example, in at least one embodiment, a customer is allocated a fixed amount of costs for usage of the dedicated server instance 450, and allocated a variable amount of costs for usage of the compute service 408. In such cases, embodiments may attempt to minimize overall cost allocation by maximizing utilization of the server instance 450, whose cost allocation is fixed, and minimizing utilization of the compute service 408, whose costs are variable and in addition to the fixed costs. This may be done, in embodiments, while also avoiding over-utilization of the dedicated server instance 450.

The server instance 450, as depicted in FIG. 4, represents a server assigned, on an ongoing and indefinite basis, the task of hosting an instance of the model server 414a. There may be many such instances, each hosting one or more model servers, but for clarity of explanation, FIG. 4 depicts only a single such instance. A server instance can include any computing device suitable for hosting the model server 414a.

The compute service 408 provides for serverless invocation of the compute function 410, and embodiments of the compute service 408 may correspond to those described in relation to the compute service 108 depicted in FIG. 1.

The compute function 410 comprises a unit of executable code that is invoked and executed by the compute service 408 using dynamically allocated computing capacity. Embodiments of the compute function 410 may correspond to those described in relation to the compute function 110 depicted in FIG. 1.

The extension 412 comprises code to interface with the model server 114, and embodiments of the extension 412 may correspond to those described in relation to the compute function 110 depicted in FIG. 1. Similarly, the model server 414 comprises code to interface with the machine learning model 416, and embodiments of the model server 414 may correspond to those described in relation to the compute function 110 depicted in FIG. 1

Embodiments of the machine learning service 418 and machine learning model 416 can also correspond to those described in relation to the machine learning service 118 and machine learning model 116 described in relation to FIG. 1. Note that here, an individual machine learning model 416, trained to perform some particular type of inference, is used by both an model server 414a that runs on a dedicated server instance, and another model server 414b that is executed via a serverless computing architecture that comprises the compute service 408. Furthermore, the model servers 414a, 414b may be instances of the same model server, meaning that the code that makes up both instances is the same. This conveys a technical advantage in that the customer need only provide or define a single endpoint, but can use that model server in both architectures. In some embodiments consistent with FIG. 4, the model server 414b is associated with an extension 412 in order to use the model server 414b within a serverless computing architecture.

Figure 5:
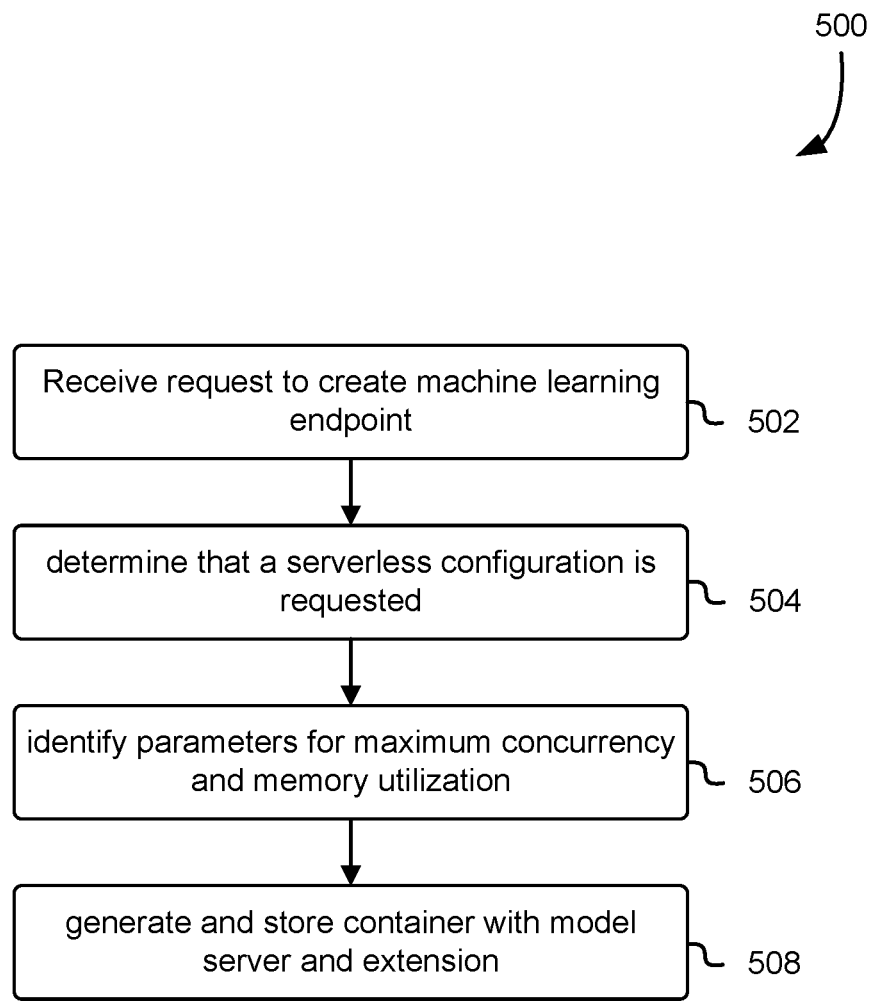
FIG. 5 illustrates an example process for configuring a serverless compute architecture to perform machine learning inference, in accordance with at least one embodiment.

FIG. 5 illustrates an example process for configuring a serverless compute architecture to perform machine learning inference, in accordance with at least one embodiment. Although the example procedure 500 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 500 is implemented by a system which incorporates a serverless compute architecture, such as any of those depicted in or described in relation to the figures.

At 502, the system receives a request to create an endpoint to provide machine learning services. In embodiments, endpoint creation refers to the system enabling itself to receive requests to interact with a machine learning model.

In at least one embodiment, the endpoint is associated with a network address, to which requests to access the machine learning model are directed. In other embodiments, model servers associated with the endpoint are associated with network addresses.

At 504, the system determines that a serverless configuration has been requested. For example, in at least one embodiment, the request to create an endpoint may be accompanied by metadata which specifies attributes desired for the endpoint, and which may also include a flag or other value indicating that the endpoint should be hosted in a serverless configuration. Additional attributes related to the serverless configuration might also be include in the request.

At 506, the system identifies parameters for maximum concurrency and memory utilization of the serverless compute architecture. These may also be specified via metadata included with the request to create an endpoint. Concurrency refers to the number of requests directed to the endpoint that are pending at a given time. Memory utilization refers to usage of system memory. It will be appreciated that these examples are intended to be illustrative rather than limiting.

At 508, the system generates and stores a container that comprises a model server associated with the requested endpoint and an extension. Here, the model server refers to code and/or configuration data for implementing the model server, and the extension refers to code that at least includes instructions for interfacing with the model server. The container, model server, and extension may refer to embodiments described herein in relation to the figures, including those described in relation to FIG. 1.

The stored container can then be located and recalled from storage when the system receives a request directed to the corresponding endpoint. For example, the container may be stored in a repository that is indexed by network address. A similar approach may be used to store and index metadata associated with the endpoint. When the system receives a request directed to the endpoint, it can use the index to determine that the request should be handled via a serverless compute architecture, load the container, and proceed to process the request. Examples of embodiments processing a request are described herein in relation to the figures, including in relation to FIG. 1.

Figure 6:
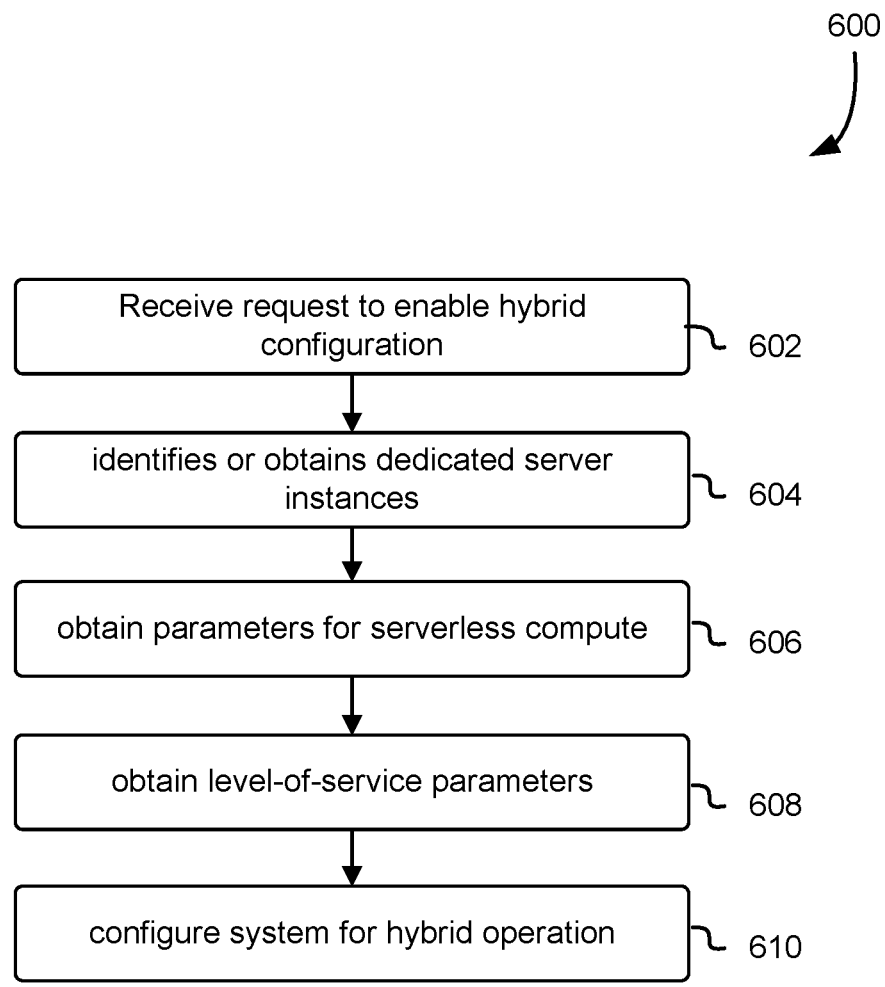
FIG. 6 illustrates an example process for configuring a hybrid compute architecture to perform machine learning inference, in accordance with at least one embodiment.

FIG. 6 illustrates an example process for configuring a hybrid compute architecture to perform machine learning inference, in accordance with at least one embodiment. Although the example procedure 600 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 600 is implemented by a system which incorporates a serverless compute architecture, such as any of those depicted in or described in relation to the figures.

At 602, the system receives a request to enable a hybrid configuration for the provision of machine learning inference. As described above in relation to FIG. 5, a request to create an endpoint for communicating with a machine learning model can include information indicating how the endpoint should be configured. This can include information indicating that a hybrid configuration can be used. In a hybrid configuration, the system employs one or more dedicated servers to handle a portion of requests directed to the corresponding endpoint or model server, and a serverless compute architecture to handle a remaining portion. In some cases, this is done to handle surges in demand, or to temporarily handle increased demand until new dedicated instances can be added.

At 604, the system identifies or obtains dedicated server instances. The servers are referred to as dedicated because they are assigned the role of processing requests directed to the endpoint or associated model server on an ongoing basis. This generally involves the model server being installed on the server, and remaining activated over a succession of requests. Furthermore, the dedicated server may be allocated to the same user or account as the endpoint, and not used by other users or accounts.

In some cases, an endpoint may be reconfigured so that it converts from a server-full configuration to a hybrid configuration. In such cases, the system may identify any existing dedicated servers and continue to use those to process a portion of incoming requests, and configure a serverless compute architecture to process an additional portion.

In other cases, such as when the endpoint is first being created, the system may obtain access to one or more dedicated servers, configure them for processing a portion of requests directed to the endpoint, and configure a serverless compute architecture to process an additional portion.

At 606, the system obtains parameters for operating the serverless compute architecture. These parameters may include those described above in relation to FIG. 5. In addition, at 608, the system obtains level-of-service parameters. These can include parameters related to desired utilization levels for the dedicated servers. To illustrate, higher service levels might be achieved, in some embodiments, by keeping utilization of the dedicated servers relatively low, and readily transferring load to the serverless compute architecture if that amount of utilization is exceeded. On the other hand, this might result in the user being allocated additional costs over and above a fixed cost associated with the dedicated instances. Embodiments may address this by allowing the user to indicate how capacity utilization should be divided between the dedicated instances and the serverless compute architecture.

At 610, the system configures itself for hybrid operation. This may include generating and storing a container for the model server and extension, using steps similar or identical to those described in relation to FIG. 5. The configuration of the hybrid system may also comprise configuring a router, such as the router 404 depicted in FIG. 4, to distribute workload between one or more dedicated servers and the serverless compute architecture.

Once configured, the system operating in hybrid mode can load balance between dedicated server instances and the serverless compute architecture. In at least one embodiment, this load balancing can comprise maximizing utilization of the dedicated servers, and transferring load to the serverless compute architecture when utilization of the dedicated servers exceeds the desired parameters.

In at least one embodiment, the system may generate recommendations for adjusting the number of dedicated servers, based on usage patterns and costs associated with the serverless computing architecture. The recommendations, for example, might be to add additional dedicated servers if utilization of the serverless compute architecture is consistently high, or to remove servers if the system determines that periodic surges in demand can be efficiently handled using the serverless compute architecture. It will be appreciated that these examples are intended to be illustrative, rather than limiting.

Figure 7:
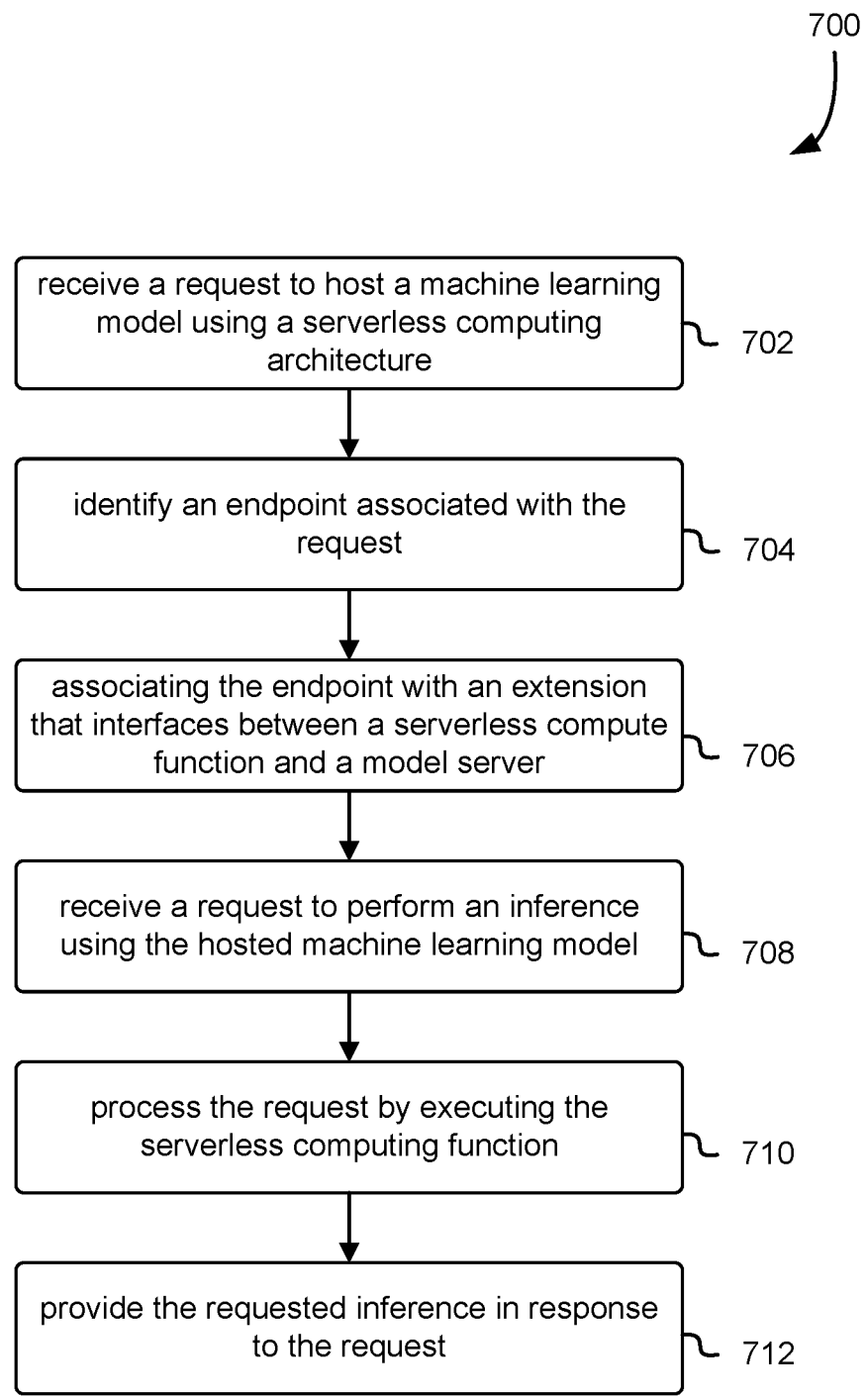
FIG. 7 illustrates an example process for using a serverless compute architecture to perform machine learning inference, in accordance with at least one embodiment.

FIG. 7 illustrates an example process for using a serverless compute architecture to perform machine learning inference, in accordance with at least one embodiment. Although the example procedure 700 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 700 is implemented by a system which incorporates a serverless compute architecture, such as any of those depicted in or described in relation to the figures.

At 702, the system receives a request to host a machine learning model using a serverless computing architecture. The request, in at least one embodiment, includes information that indicates which machine learning model is to be used, or includes information indicating an endpoint that is to be used to access the machine learning model.

At 704, the system identifies an endpoint associated with the request. The request may comprise data that indicates an association between a machine learning model and an endpoint. The endpoint may be associated with a model server that, as described herein in relation to various embodiments, may be used to access the machine learning model and perform inferences. The model server may contain code to interface between a client and the machine learning model, such as code that implements an HTTP server whose methods can be used to perform inference using the model.

At 706, the system associates the endpoint with an extension, where the extension interfaces between a serverless compute function and a model server. This can include code to translate data provided by a compute function to a format compatible with the model server, so that when the compute function is invoked by the serverless computing architecture, it can be made compatible with whatever format is expected by the model server. For example, in embodiments where the model server implements an HTTP server, the extension might translate data to a data format compatible with the HTTP server's web-based methods.

In at least one embodiment, the extension includes code that, upon invocation by a compute function of the serverless architecture, causes the machine learning model to be made accessible to the model server. In at least one embodiment, this is done by calling initialization functions associated with the model server.

In at least one embodiment, a model server or associated endpoint is associated with the extension by creating a container file. For example, the system might generate a file comprising the model server and the extension, store the file, and store and association between the file and information identifying the endpoint. This information can then be subsequently used to locate the file based on information provided in a request to perform an inference. In at least one embodiment, the information is a network address associated with the endpoint or model server.

At 708, the system receives a request to perform an inference using the hosted machine learning model. The request may be received by the system as a web-based request directed to the endpoint or model server. The system may then determine that the request should be processed using a serverless compute architecture.

At 710, the system processes the request by executing the serverless computing function. The compute function, when executed, uses the extension to obtain, via a model server, an inference generated by the machine learning model. The flow of control, generally speaking, comprises a compute service invoking the compute function, the compute function invoking methods of the extension, and the extension invoking methods of the model server. Interfacing between the extension and the model server may occur after the extension has performed suitable initialization procedures on the endpoint.

At 712, the system provides the requested inference in response to the request. In at least one embodiment, the extension invokes one or more methods on the model server to cause the model server to access the machine learning model. The machine learning model performs the inference, and data that constitutes the results of the performed inference are returned via the model server.

Figure 8:
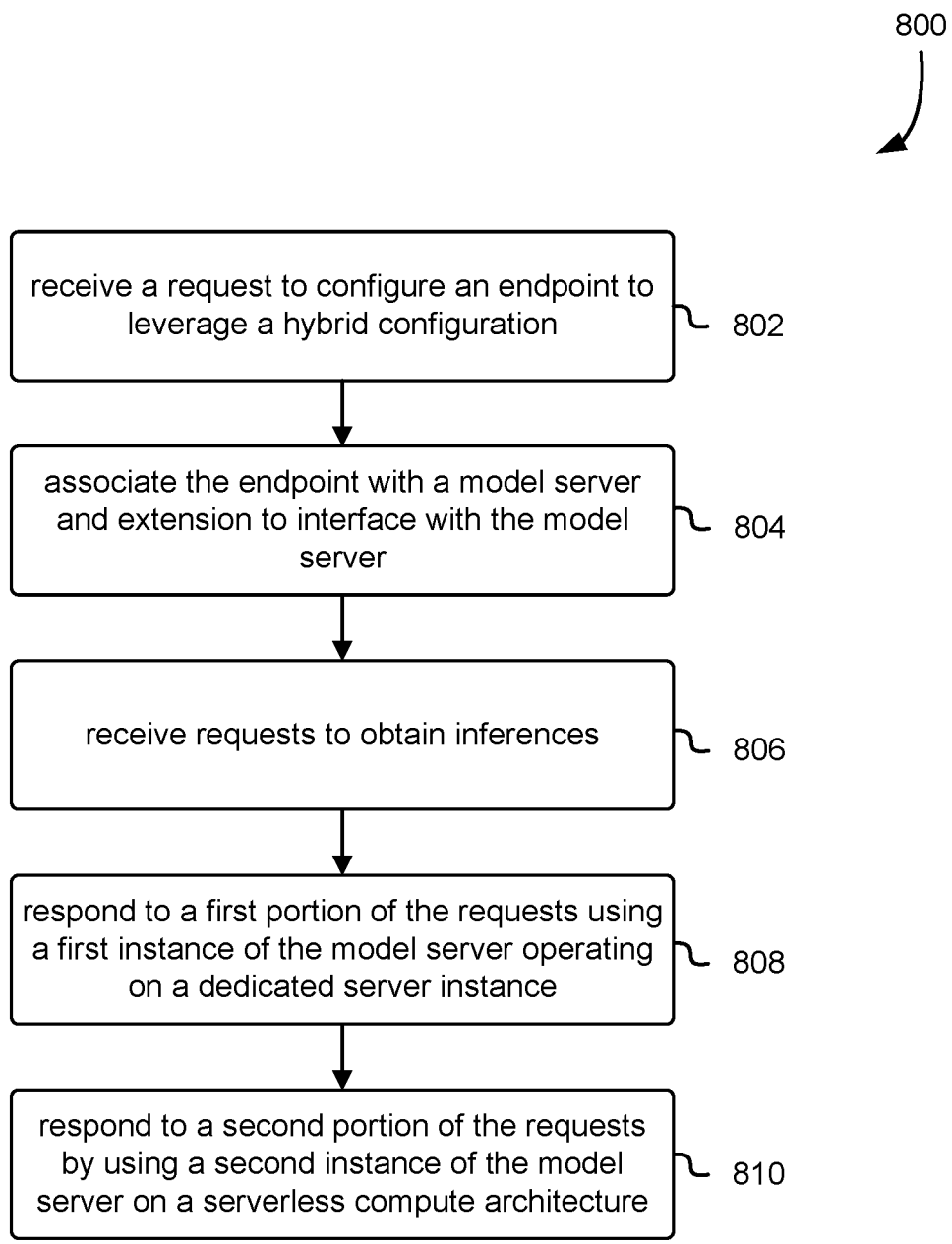
FIG. 8 illustrates an example process for using a hybrid compute architecture to perform machine learning inference, in accordance with at least one embodiment.

FIG. 8 illustrates an example process for using a hybrid compute architecture to perform machine learning inference, in accordance with at least one embodiment. Although the example procedure 600 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 800 is implemented by a system which incorporates a serverless compute architecture, such as any of those depicted in or described in relation to the figures.

At 802, the system receives a request to configure an endpoint to leverage a hybrid configuration. The system can then identify a model server associated with the endpoint, where the model server comprises code to interface with a machine learning model. In some cases, the endpoint may have been created previously, such as in cases where the system is to transition from a configuration that relies only on dedicated instances to one that relies on a hybrid configuration. In other cases, a new endpoint is created.

At 804, the system associates the endpoint or model server with an extension comprising code to interface with the model server. As described herein, for example in relation to FIG. 4, this can comprise generating a container that includes code for both the model server and extension, and storing information that can be used to determine that a serverless compute architecture has been configured to support serverless processing of an inference request.

At 806, the system receives requests to obtain inferences. The requests may be received over time, in various patterns that can include surges in demand or steadily increasing demand. It will be appreciated that these examples are intended to be illustrative, rather than limiting. The system may then divide responsibility for processing these requests according to an intended pattern, for example as described above in relation to FIG. 6. Accordingly, in at least one embodiment, the system divides requests between the two systems based on capacity of the dedicated servers.

At 808, the system responds to a first portion of the requests using at least a first instance of the model server that is operating on at least one dedicated server instance. In some cases and embodiments, the first portion is determined by maximizing utilization of the dedicated instance, up to some maximum amount of utilization, and any remaining portion of the requests is allocated to the serverless compute architecture.

At 810, the system responds to a second portion of the requests using a second instance of the model server on a serverless compute architecture. The serverless compute architecture then dynamically allocates capacity for processing this portion of requests, according to the size of the second portion.

The systems, techniques, and methods described herein may be applied to a variety of computational services, including but not necessarily limited to machine learning models, simulations, web-based applications, or other units of code. In general, the disclosed techniques may be applicable in scenarios including, but not necessarily limited to, those in which a software application is accessed using an architecture that includes the disclosed model server.

In an embodiment, a system comprises at least one processor and a memory comprising computer-executable instructions that, in response to execution by the at least one processor, cause the system to configure a serverless compute architecture to host a computational service. A computational service can include a machine learning model, a computer-based simulation, a web-based application, or other computer service, provided that the computational service is accessed via a model server as described herein. The system configures the serverless compute architecture to host the computational service by at least associating an endpoint with an extension that comprises code to interface with a model server, where the model server comprises code to access the computational service. The system may then receive a request to obtain a result from the computational service, and respond to the request by executing a compute function on the serverless compute architecture. The compute function invokes one or more functions implemented by the extension and the one or more functions obtain, via the model server, a result generated by the computational service.

In at least one embodiment, the one or more functions implemented by the extension, upon invocation by the serverless compute function, cause the computational service to prepare for use by the model server.

In at least one embodiment, the memory of the system comprises further computer-executable instructions that, in response to execution by the at least one processor, cause the system to intercept the request in response to determining that the request is directed to a network address associated with the model server and that the endpoint has been configured to utilize the serverless compute architecture.

In at least one embodiment, the model server comprises code to enable hosting of the model server on an instance of a server that has been reserved for providing access to the computational service.

In at least one embodiment, the serverless compute architecture dynamically allocates computing capacity, in accordance with demand, to process requests to obtain inferences using the computational service.

In another example, a method of utilizing a hybrid configuration comprises obtaining a model server that comprises code to interface with a computational service, and associating the model server with an extension that interfaces with the model server. Upon receiving requests to obtain results by using the computational service, the method comprises responding to a first portion of the requests by using a first instance of the model server installed on a server, and responding to a second portion of the requests by using a serverless compute architecture. To use the serverless compute architecture, the method comprises invoking a compute function that uses the extension and at least a second instance of the model server to obtain results from the computational service.

Figure 9:
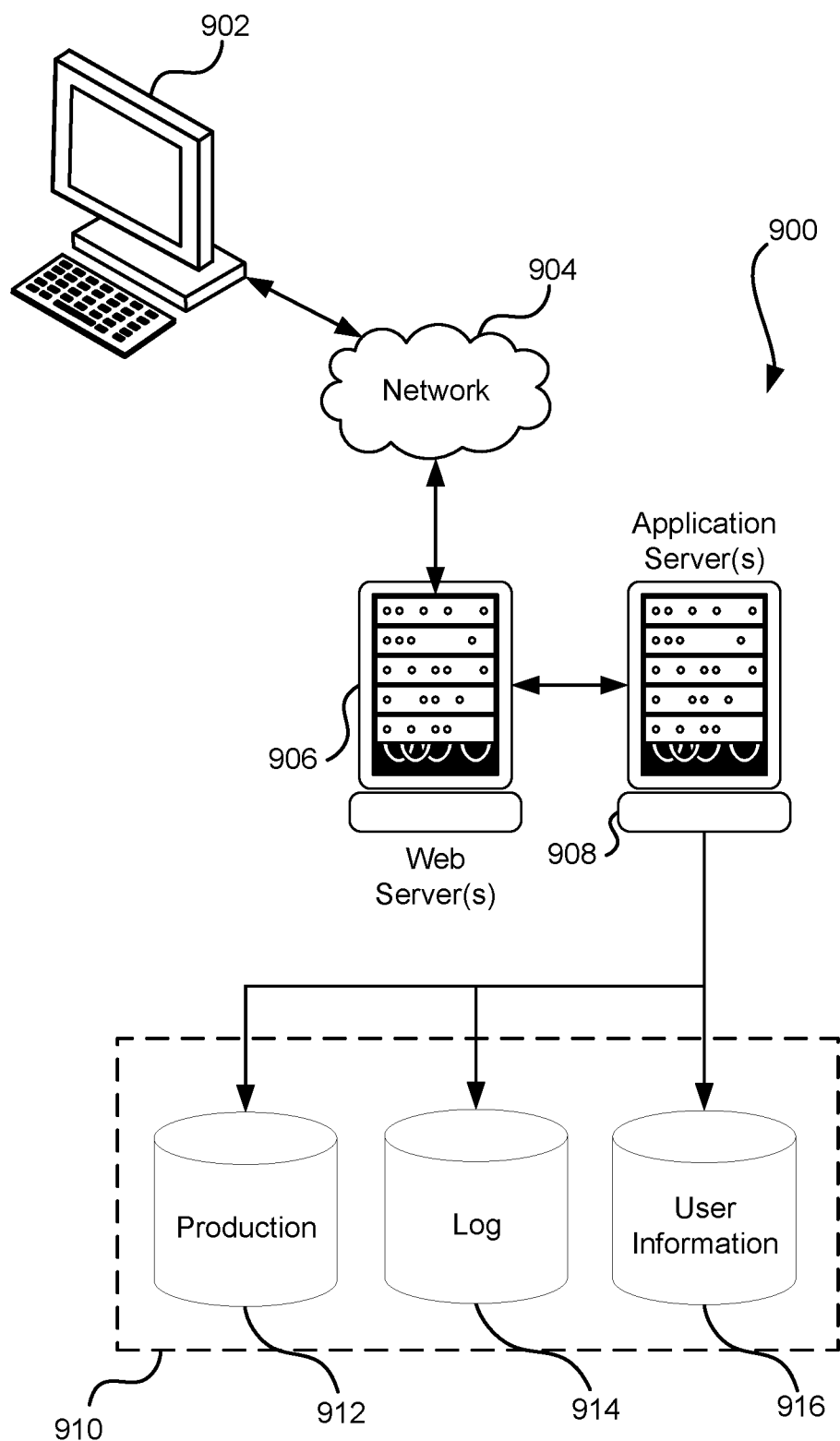
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a first request to host a machine learning model on a serverless compute architecture, the first request comprising an indication of an endpoint comprising code to access the machine learning model;
   associating a model server with an extension, the model server associated with the endpoint, the extension comprising code to interface with the model server;
   receiving a second request to generate an inference using the machine learning model;
   processing the second request by at least executing a compute function on the serverless compute architecture, wherein the compute function uses the extension to obtain, via the model server, an inference generated by the machine learning model; and
   providing the inference in response to the second request;
   wherein the serverless compute architecture adds or removes computing capacity based, at least in part, on a volume of requests to generate inferences using the machine learning model.

2. The computer-implemented method of claim 1, wherein code in the extension, upon invocation by the compute function, causes the machine learning model to be made accessible to the model server.

3. The computer-implemented method of claim 1, further comprising:
   generating a file comprising the model server and the extension;
   storing the file; and
   storing an association between the file and the endpoint, wherein the information is suitable for locating the file based on information included in the second request.

4. The computer-implemented method of claim 1, wherein the extension comprises code to translate data provided by the serverless compute function to a format compatible with a web server implemented by the model server.

5. A system, comprising:
at least one processor; and
memory comprising computer-executable instructions that, in response to execution by the at least one processor, cause the system to:
configure a serverless compute architecture to host a computational service by at least associating an endpoint with an extension that comprises code to interface with a model server associated with the endpoint, wherein the model server comprises code to access the computational service;
receive a request to obtain a result from the computational service; and
respond to the request by at least executing a compute function on the serverless compute architecture, wherein the compute function invokes one or more functions implemented by the extension and the one or more functions obtain, via the model server, a result generated by the computational service;
wherein the serverless compute architecture dynamically allocates computing capacity, in accordance with demand, to process requests to obtain inferences using the computational service.

6. The system of claim 5, wherein the one or more functions implemented by the extension, upon invocation by the serverless compute function, cause the computational service to be prepared for use by the model server.

7. The system of claim 5, the memory comprising further computer-executable instructions that, in response to execution by the at least one processor, cause the system to:
intercept the request in response to determining that the request is directed to a network address associated with the model server and that the endpoint has been configured to utilize the serverless compute architecture.

8. The system of claim 5, the memory comprising further computer-executable instructions that, in response to execution by the at least one processor, cause the system to:
generate a file comprising the endpoint and the extension;
store the file;
store an association between the file and the endpoint; and
use the information to locate the file based on information included in the request to generate an inference.

9. The system of claim 5, wherein the one or more functions implemented by the extension translate data provided by the serverless compute function to a format usable by the model server.

10. The system of claim 5, wherein the model server comprises code to enable hosting of the model server on an instance of a server reserved for providing access to the computational service.

11. The system of claim 5, wherein the server implements an HTTP server and wherein the extension interfaces with the endpoint to activate the HTTP server.

12. A non-transitory computer-readable storage medium storing thereon executable instructions that, as a result of being executed by one or more processors of a computer system, cause the computer system to at least:
configure a serverless compute architecture to host a machine learning model by at least associating an endpoint with an extension that comprises code to interface with the endpoint, wherein a model server associated with the endpoint comprises code to interface with the machine learning model;
receive a request to generate an inference using the machine learning model; and
process the request by at least executing a serverless compute function on the serverless compute architecture, wherein the serverless compute function uses the extension to obtain, via the model server, an inference generated by the machine learning model;
wherein the serverless compute architecture adds or removes computing capacity based, at least in part, on a volume of requests to generate inferences using the machine learning model.

13. The non-transitory computer-readable storage medium of claim 12, wherein extension causes the machine learning model to be made accessible to the model server.

14. The non-transitory computer-readable storage medium of claim 12, wherein the instructions further comprise instructions that, as a result of being executed by the one or more processors, cause the computer system to:
intercept the request to generate an inference in response to determining that the request is directed to a network address associated with the model server and that the endpoint has been configured to utilize the serverless compute architecture.

15. The non-transitory computer-readable storage medium of claim 12, wherein the instructions further comprise instructions that, as a result of being executed by the one or more processors, cause the computer system to:
generate a file comprising the model server and the extension;
store the file; and
retrieve the file from storage in response to receiving the request to generate an inference.

16. The non-transitory computer-readable storage medium of claim 12, wherein the extension translates data provided by the serverless compute function to a format compatible with a web server implemented by the model server.

17. The non-transitory computer-readable storage medium of claim 12, wherein the endpoint comprises codes to obtain an inference using the machine learning model and the extension comprises code to obtain the inference using the model server.

18. The non-transitory computer-readable storage medium of claim 12, wherein the machine learning model is hosted by a computing service accessed by the model server.

* * * * *